(12) United States Patent
Crooks et al.

(10) Patent No.: US 11,775,952 B2
(45) Date of Patent: Oct. 3, 2023

(54) MULTI-CAMERA SIMULTANEOUS IMAGING FOR MULTIPLE PROCESSES

(71) Applicant: NCR Corporation, Duluth, GA (US)

(72) Inventors: John Crooks, Duluth, GA (US); Christopher John Costello, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 153 days.

(21) Appl. No.: 15/445,327

(22) Filed: Feb. 28, 2017

(65) Prior Publication Data

US 2018/0247292 A1    Aug. 30, 2018

(51) Int. Cl.
*G06Q 20/20* (2012.01)
*G06K 19/06* (2006.01)
*G06K 7/14* (2006.01)

(52) U.S. Cl.
CPC ............. *G06Q 20/208* (2013.01); *G06K 7/14* (2013.01); *G06K 7/1404* (2013.01); *G06K 19/06028* (2013.01); *G06K 19/06037* (2013.01)

(58) Field of Classification Search
CPC ...... G06Q 20/208; G06K 7/14; G06K 7/1404; G06K 19/06028; G06K 19/06037; G06K 7/1096; G06K 7/109; H04N 7/181
See application file for complete search history.

(56) References Cited

U.S. PATENT DOCUMENTS

| | | | |
|---|---|---|---|
| 2003/0016865 A1* | 1/2003 | Lopez | H04N 1/6086 382/165 |
| 2009/0020611 A1* | 1/2009 | Sackett | G06K 7/10722 235/462.14 |
| 2009/0160944 A1* | 6/2009 | Trevelyan | H04N 5/2354 348/187 |
| 2009/0268941 A1* | 10/2009 | French | G08B 13/1961 382/103 |

(Continued)

FOREIGN PATENT DOCUMENTS

| | | |
|---|---|---|
| CN | 104252612 A | 12/2014 |
| CN | 106022784 A | 10/2016 |

(Continued)

OTHER PUBLICATIONS

EP Search Report—dated Jul. 25, 2018.

*Primary Examiner* — Florian M Zeender
*Assistant Examiner* — Vanessa Deligi
(74) *Attorney, Agent, or Firm* — Schwegman Lundberg & Woessner, P.A.

(57) ABSTRACT

Various embodiments each include at least one of systems, devices, methods, and software for multi-camera simultaneous imaging for multiple processes. Some such embodiments may be embodied in a dedicated appliance or chip while other embodiments may be embodied in a product scanner, in software, or in a combination of hardware and software. One method embodiment includes receiving images from a plurality of cameras, the images from each device captured at various illumination and exposure levels.

(Continued)

This method then sorts the images based on illumination and exposure levels for distribution to a plurality of image processing services that each perform at least one task with regard to a received image and then presents the images to respective services for which they are sorted.

16 Claims, 5 Drawing Sheets

(56) References Cited

U.S. PATENT DOCUMENTS

| | | | | |
|---|---|---|---|---|
| 2010/0059589 A1* | 3/2010 | Goncalves | ............ | G08B 13/248 382/218 |
| 2012/0211555 A1* | 8/2012 | Rowe | ................... | G06K 7/1404 235/375 |
| 2013/0134217 A1* | 5/2013 | Crooks | .............. | G06K 7/10544 235/455 |
| 2014/0160293 A1* | 6/2014 | Ristivojevic | ........... | G06Q 20/20 348/150 |
| 2014/0362159 A1* | 12/2014 | Zhai | ........................ | H04N 7/141 348/14.01 |
| 2015/0001299 A1* | 1/2015 | Crooks | ................. | G06K 7/1095 235/440 |
| 2015/0062436 A1* | 3/2015 | An | ..................... | H04N 21/4126 348/715 |
| 2016/0179356 A1* | 6/2016 | Baghadady | ............ | G11B 27/30 715/720 |
| 2016/0267529 A1* | 9/2016 | Jakobsson | .......... | G06Q 30/0241 |
| 2016/0335856 A1* | 11/2016 | Barkan | ................... | G06V 20/52 |
| 2017/0214807 A1* | 7/2017 | Pring | ..................... | H04L 69/04 |
| 2020/0267304 A1* | 8/2020 | Park | ........................ | H04N 23/76 |

FOREIGN PATENT DOCUMENTS

| | | |
|---|---|---|
| CN | 106339647 A | 1/2017 |
| DE | 20 2008 016 129 U | 11/2009 |
| EP | 2 819 060 A1 | 12/2014 |
| EP | 3 035 267 A1 | 6/2016 |
| EP | 3035267 A1 | 6/2016 |
| WO | 2013/136565 | 9/2013 |

\* cited by examiner

MULTI-CAMERA SIMULTANEOUS IMAGING FOR MULTIPLE PROCESSES

BACKGROUND INFORMATION

Point-of-Sale (POS) terminals have become reliant on imaging device, or camera, based barcode reading. But the presence of cameras has also given rise to further demands for images captured thereby for what is becoming many purposes. As a result, imaging is creating significant demands at POS terminals for processing capability.

SUMMARY

Various embodiments each include at least one of systems, devices, methods, and software for multi-camera simultaneous imaging for multiple processes. Some such embodiments may be embodied in a dedicated appliance or chip while other embodiments may be embodied in a product scanner, in software, or in a combination of hardware and software.

One method embodiment includes receiving images from a plurality of cameras, the images from each device captured at various illumination and exposure levels. This method then sorts the images based on illumination and exposure levels for distribution to a plurality of image processing services that each perform at least one task with regard to a received image and then presents the images to respective services for which they are sorted.

Another method embodiment includes receiving images from a plurality of cameras. The received images from each device are typically captured at various illumination and exposure levels. The method then proceeds by sorting the images based on illumination and exposure levels for distribution to a plurality of image processing services that each perform at least one task with regard to a received image. The method also includes processing images when needed to conform to requirements of image processing services to which the images are to be provided and then the images are presented to respective services for which they are sorted.

Another embodiment is in the form of a device. This device includes at least one input/output interface, a processor, and a memory storing instructions executable on the processor to perform data processing activities. The data processing activities, in some embodiments, include receiving images from a plurality of cameras including images via the at least one input/output interface. Again, the images from each camera are typically captured at various illumination and exposure levels. The data processing activities also include sorting images based on illumination and exposure levels for distribution to a plurality of image processing services that each perform at least one task with regard to a received image and presenting images to respective services for which they are sorted.

DETAILED DESCRIPTION

Figure 1:
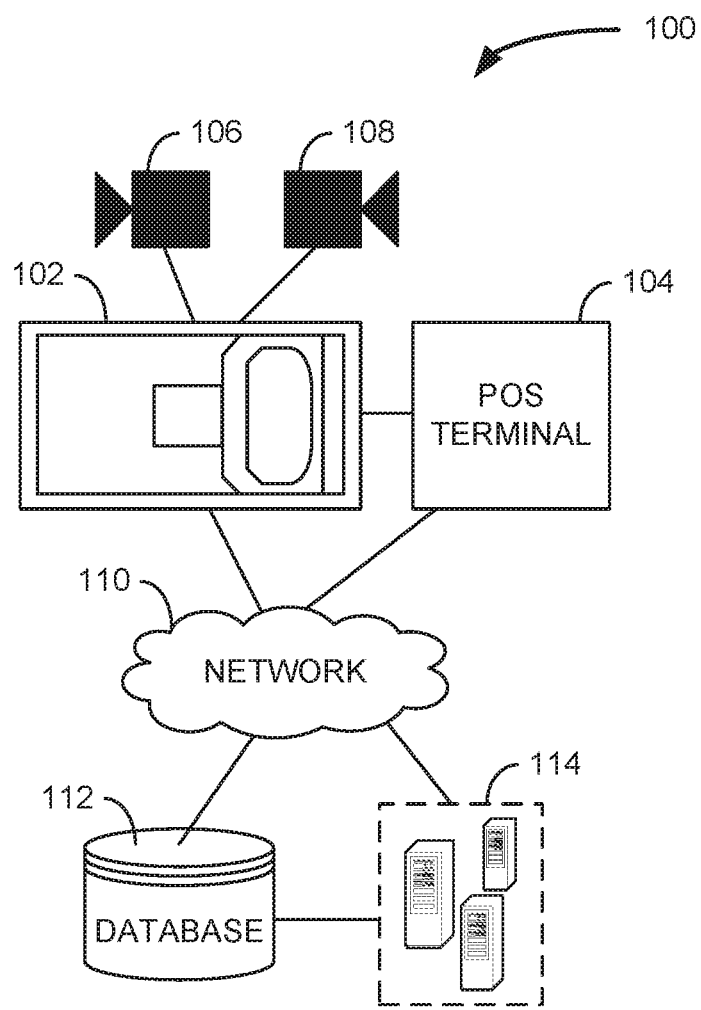
FIG. 1 is a logical block diagram of a system including a scanner, according to an example embodiment.

Various embodiments each include at least one of systems, devices, methods, and software for multi-camera simultaneous imaging for multiple processes. Some such embodiments may be embodied in a dedicated appliance or chip while other embodiments may be embodied in a product scanner, in software, or in a combination of hardware and software.

Such solutions generally operate to receive images from a plurality of cameras that may be deployed at and around a POS terminal. These cameras may be located within a product scanner, above a product scanner, such as on a pole that extends upward from the POS terminal and may include not only the camera thereon, but also a lane number or other lane marker such as an open or closed indicator. The cameras may also be located elsewhere around the POS terminal for purposes of capturing images of a scanning area, behavior of customers and a cashier, identifying categories of products presented for scanning, and otherwise. Images captured by these cameras may be utilized for several purposes including current purposes, such as barcode scanning and POS terminal scanning fraud, as well as future purposes that are under development and even some purposes that yet to be conceived. Regardless, each of these purposes includes an implementation process that processes one or more captured images to perform a task therewith. For example, a barcode reading process searches for a barcode in an image and reads the barcode when located. The output of that process may then be returned for provisioning to a POS process that generates a bill of goods for purchase and eventually a customer receipt. Other processes include processes that detect possible fraud conditions, security video monitoring and recording, one-dimensional and two-dimensional barcode reading, product watermark reading (e.g., DIGIMARC), and the like.

In view of the many cameras, the many purposes for which the images may be used, and processes that may consume the images to achieve those purposes, various embodiments herein provide an efficient framework to optimize the associated image and other data processing. Such embodiments account for inherent and process need differences in image illumination from variable imaging field illumination, exposure values, color and monochrome imaging and image processing, image contrast, image filtering, image resolution, and the like. Some such embodiments leverage processing of an image for one purpose for the needs of another purpose. For example, where one process requires a monochrome image at an original resolution and another process requires a monochrome image at a lower resolution, a color to monochrome transform may be applied first and the image provide to the first process and then the image down-sampling is performed and the image provide to the second process. While this is a simple example, this illustrates how various embodiments are able to optimize performance by reducing an amount of image processing that is performed and even a number of images that need to be captured as a single image may be purposed for two processes. Further, through sorting of images based on illumination and exposure, images with properties not conducive for certain purposes will not be processed for those purposes, thereby eliminating further processing and providing even more efficiency.

Some of these various embodiments provide multi-purpose retail imaging solution, which may be in the form of an appliance or other device, be embodied in firmware, software, or a combination thereof. These embodiments are built utilizing a diversity of camera exposure, illumination, color, position and time to capture, sort, and provide suitable camera data to a plurality of concurrent scanner services. Such scanner services may include one and two dimensional barcode scanning and reading and video-over-Ethernet security, among others. In an example embodiment, a product scanner may simultaneously capture images suitable for scanning barcodes and for video-over-Ethernet security.

In some example embodiments, a product scanner alternates capturing images using natural illumination and auto-exposure with images taken using bright LED illumination and fixed-exposure. The auto-exposed images provide an overall view of the checkout lane and are used to provide video security images over Ethernet to a network video recording system (NVR). The fixed-exposure images provide a brightly illuminated, localized view of items as they are scanned, are used to read 1D and 2D barcodes, and are available for other purposes should the requirements for those purposes align therewith.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100 including a scanner, according to an example embodiment. The system 100 is an example of deployment in a retail environment, although the various embodiments herein are also applicable to other environments, such as customer service kiosks and library checkouts, travel check-in kiosks, among others.

The system 100 includes a scanner 102 coupled to a terminal 104. The scanner 102 may be a product scanner or similar scanning device in some embodiments. An example of such a scanner is the REALSCAN 79 BI-OPTIC IMAGER available from NCR Corporation of Duluth, Ga. Such modern scanners utilize one or more cameras in performing their scanning functions. Some such scanners even have four or more cameras included therein. Additional cameras may also be coupled to or otherwise be in communication with the scanner 102 or the terminal 104, such as a camera that may be mounted on a pole on the ceiling to provide an overhead view of one or both of the terminal 104 and scanner 102 areas. As such, these cameras may be utilized to capture images of many things including items presented for scanning or weighing, an area around the terminal, a cashier at the terminal 104 or a neighboring terminal, customers at the terminal 104 or in line, and other areas.

The terminal 104 may be a modern cash register serviced by a checkout clerk or cashier, or it can be a self-checkout terminal or other Self-Service Terminal (SST), customer service kiosk, and the like. In some embodiments, the scanner 102 is coupled, via either wired or wireless connections, to one or more additional cameras, such as cameras 106, 108. However, various embodiments may include one camera, three, four, and even more cameras. In some embodiments, the camera 106 may be pointed in the direction of a customer presenting items to purchase and documents to complete a purchase transaction at the terminal 104. Similarly, the camera 108 may be pointed in the direction of a terminal 104 clerk. Other cameras, such as cameras integrated within the scanner 102 may be directed toward a scan field of the scanner 102 to capture images of barcodes, watermarks embedded within product packaging (e.g., DIGIMARC), and the environment around the scanner 102 and terminal 104.

The system 100 also typically includes a network 110 that connects one or both of the scanner 102 and the terminal 104 to other computing devices. The other computing devices may include one or more transaction processing systems 114, one or more databases 112 that may store transaction, product, and other related data, depending on the particular embodiment. The network 110 may also provide a connection to a security video-over-Ethernet storage, viewing, and monitoring system that receives images and video from the cameras 106, 108 and the scanner 102 cameras deployed at the terminal 104.

Figure 2:
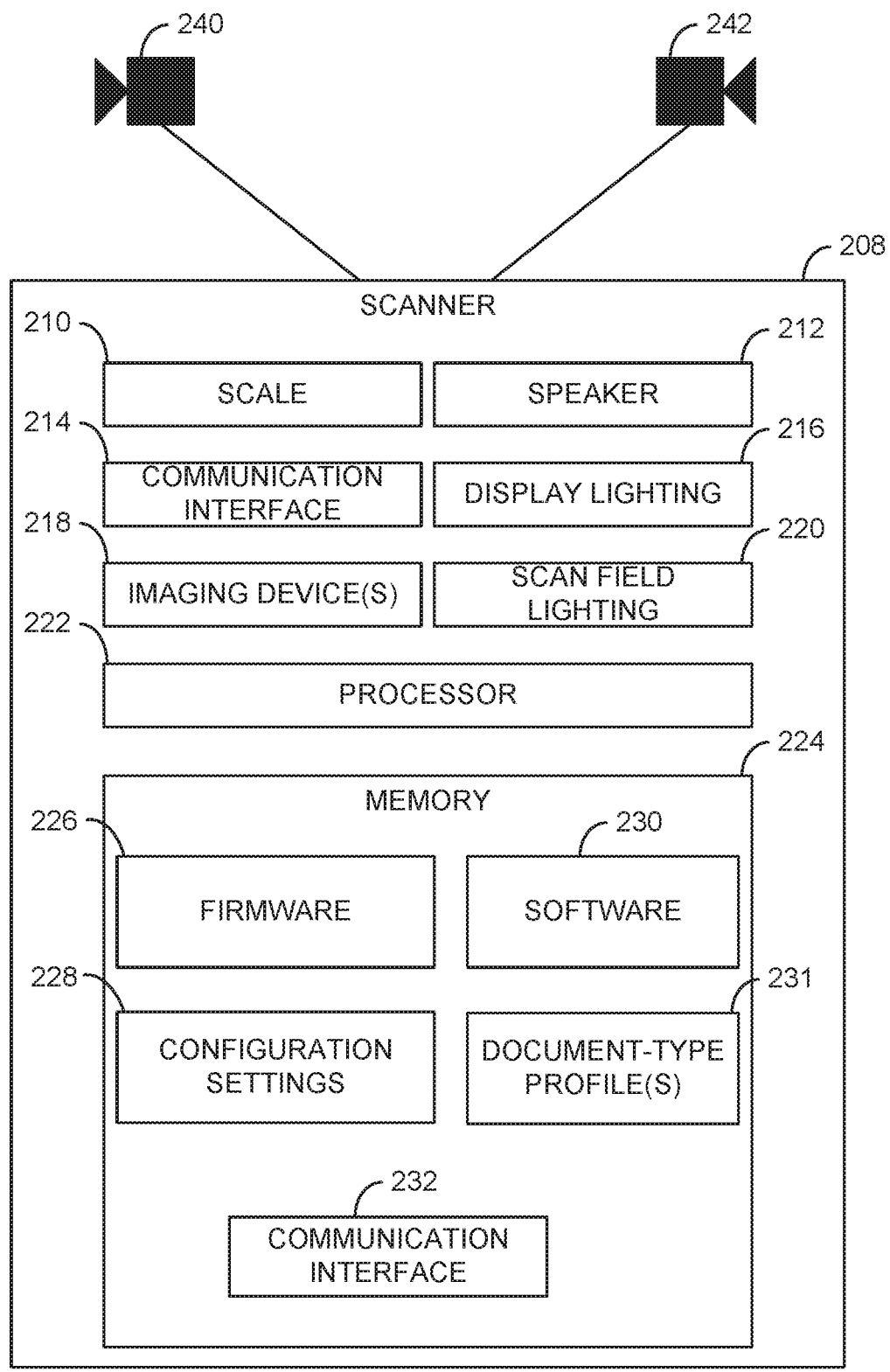
FIG. 2 is a diagram illustrating components of a scanner that may be deployed at a checkout station such as a POS terminal, self-service terminal (SST), or other kiosk system including a scanner, according to an example embodiment.

FIG. 2 is a diagram illustrating components of a scanner 208 that may be deployed at a checkout station such as a POS terminal, self-service terminal (SST), or other kiosk system including a scanner 208, according to an example embodiment. It is to be noted that the scanner 208 is shown schematically in greatly simplified form, with example components relevant to understanding various embodiments herein. Note that the scanner 208 may include more or fewer components in some embodiments.

Furthermore, the various components included in the FIG. 2 as illustrated and arranged are provided for illustration purposes only. It is to be noted that other arrangements with more or fewer components are possible without departing from the contributions herein.

Moreover, the methods and scanner 208 presented herein and below may include all or some combination of the components described and shown in the various contexts herein. Further, although the scanner 208 may be paired with a POS terminal, the scanner 208 may be a standalone element or an element of other systems, devices, and terminals in other embodiments. Examples of other terminal-types that may include a scanner 208 are SSTs, clerk operated and self-service library checkout stations, time-keeping terminals, and the like. Additionally, although a scanner is illustrated in FIG. 2 according to some embodiments, the in-scanner image sorting and processing described herein may also be implemented with regard to images and video streams generated by other devices, such as stand-alone cameras, such as one or more of cameras 240, 242 that may be coupled either directly or indirectly via USB or a network to the scanner 208.

The methods of some embodiments are programmed as executable instructions in memory and/or non-transitory computer-readable storage media and executed on one or more processors associated with the components and devices herein. For example, some embodiments may be deployed as firmware present within the scanner 208, such as firmware 226. In other embodiments, the in-scanner image sorting and processing functions may be deployed as software on the scanner or network deployed service accessible by the scanner. In other embodiments, the image sorting and processing may be performed on a computer controlling a POS terminal to which the scanner 208 is coupled, on a network server, or on a combination of two or more of the scanner 208, the computer controlling the POS terminal to which the scanner 208 is coupled.

The scanner 208 may be referred to herein as a product scanner or barcode scanner as that is the task most commonly associated with such devices. During operation, items are placed within a scan field of the scanner 208. One or more imaging devices 218 of the scanner 208, such as one or more cameras, then scan a barcode and information read therefrom is communicated to a POS system. The POS system then uses that data to identify the item placed within the scan field of the scanner 208 and performs an additional function. The additional function may include a price lookup and addition of the item to a list of items to be purchased, which may be presented on the one or more POS displays. The additional function may also include identifying a scanned product as a controlled item for which an age, identity, and/or address validation must be performed. A message may be presented on the one or more POS displays and a message may also be sent to the scanner 208 indicating an identification card or other document is to be scanned. Other additional functions may also be performed in different embodiments.

The scanner 208 may include one or more scan fields, such as two scan fields of hi-optic scanners that are commonly seen in grocery and discount retail outlets. In addition to the imaging devices 218, the scanner 208 may include various other components. The various other components may include an integrated scale 210 such as may be used in a grocery outlet to weigh produce and one or both of a speaker 212 and display lighting 216 to output audio and visual signals such as signals of (un)successful scans. The scanner 208 may also include scan field lighting 220 that may be turned on and off and adjusted based on a detected presence of an item to be scanned. The scan field lighting 220 may include one, two, or more different light colors, such as white, red, green, infrared, and possibly others. Additionally, scan field lighting 220 may be of variable intensity or brightness in some embodiments and be varied by applying different electric potentials to the lighting elements or adjusting a number of lighting elements, such as LEDs, that are illuminated.

During typical operation, the scanner 208 is operated according to instructions executed on a processor 222. The processor 222 may be an application specific integrated circuit (AMC), digital signal processor, microprocessor, or other type of processor. The instructions may be firmware 226 or software 230 stored in one or more memories 224. The one or more memories 224 may be or include volatile and non-volatile memories, write-protected memories, write-once memories, random access memory (RAM), read only memories (ROM), secure memory, and other memory and data storage types and devices.

The instructions as may be stored in firmware 226 or as software 230 in memory 224 are executed according configuration settings stored in the memory 224. The configuration settings 228 configure operation of the scanner 208 and the various components therein. For example, the configuration settings 208 may configure speaker 212 volume, display lighting 216 outputs, and scan field lighting 220 brightness. The configuration settings may also configure decoding algorithms of the imaging device(s) 218 and the instructions, one or more communication protocols used to communicate data from the scanner 208 to a POS system or other system via wired or wireless connections, and scale 210 operating parameters (e.g., unit of measure as pounds or kilograms). The configuration settings may also configure other settings of the particular scanner 208 an embodiment may include. In some embodiments, the configuration settings 228 may include a firmware version, a software version, and the like. Thus, when a configuration is set or updated, the setting or updating of the configuration settings 228 may include population and updates of any of the configuration settings 228 of a particular embodiment, including an update to firmware and software present on the scanner.

The scanner 208 may include one or more communication interfaces 214, 232 that enable the scanner 208 to communicate via one or both of wired and wireless connections over a network and with other computing devices. In some embodiments, the communication interface 232 may provide a virtualized communication connection on the scanner 208 that enables the scanner to communicate over a network leveraging network connectivity of a terminal or other computing device with which the scanner is paired, such as a POS terminal.

During operation, the one or more imaging devices 218 of the scanner 208 capture images, such as still images and frames of video. These still images and video may be stored within the memory 224 or other data storage device of the scanner 208, a terminal or other device paired therewith, or transmitted via one of the communication interface 214, 232 over a network. In other embodiments, the video is simply captured and processed on the scanner 208 and discarded. However, in some circumstances, certain images are needed, such as images of documents presented for payment, identity verification, for security video recording (e.g., ONVIF video-over-Ethernet, UVC over USB) and the like. In such instances, these images are processed according to instructions stored in software 230, firmware 226, or by passing such images POS terminal controlling computer or a network service via one of the communication interface 214, 232 for appropriate processing.

In some embodiments, the scanner 208 includes four internal imaging devices 218 and a remote customer scanner (RCS) that communicates with the scanner 208 over a wire or wirelessly. The scanner 208 may be connected to a POS terminal via USB and to an ONVIF NVR (network video recorder) via the communication interface 214 to an Ethernet network.

The processing in some embodiments, from a general perspective, includes the scanner 208 imaging devices 218 and other cameras 240, 242 capturing images utilizing a diversity of camera exposure, illumination, resolution, cropping, color modes, positions, and times. The software 230 or firmware 226 of the scanner may then process and sort the diversity of images to suit each of a number of desired services. Optionally, to reduce processing load, the scanner 208 may process and sort images in a centralized task to minimize duplication of processor 222 usage. The scanner 208 then presents the processed and sorted images to each of the desired services for further action.

In some such embodiments, the scanner 208 captures images utilizing a diversity of camera 218, 240, 242 exposure, illumination, resolution, cropping, color modes, position, and time. In some such embodiments, a camera 218, 240, 242 control process communicates with the cameras 218, 240, 242, for example by I2C interface, to control and coordinate individual camera 218, 240, 242 behaviors. Also, the different cameras 218, 240, 242 can be color or monochrome, or include a variable output option that allows one or more of the cameras 218, 240, 242 to output a color or monochrome image.

Time diversity in some embodiments may be periodic or event driven, such as upon detection of an event by a scanner 208 process, such as movement in a camera 218, 240, 242 field of view after a POS terminal or the scanner 208 entering an idle state.

In some embodiments, the scanner 208 processes and sorts the diversity of images to suit each of the desired scanner services. Processing and sorting can be done in software 230, firmware 226 that may reside on the scanner 208, on a connected POS terminal, on a server, or on a hybrid combination. In some embodiments, the processing of the images may include one, two, or more, among others, o reducing resolution, for example using a pyramid filter, adjusting color, for example altering or applying white balance, separating colors, for example by applying a de-Bayer filter, and adjusting brightness or contrast. The processing may also include one or more of applying a region-of-interest or frame-of-interest filter, to flag frames containing a 1D barcode, 2D barcode, or some other item of interest, detecting motion, detecting item substitution, detecting and removing image portions, such as a background and hand and arms of a cashier included in an image, and other processing.

In these and some other embodiments, the scanner 208 may sort images by evaluating metadata associated with each image. The metadata may be stored in memory in image headers. Metadata for sorting purposes may include camera source and location, exposure parameters, illumination, for example on/off or red/white, camera type (e.g., color or monochrome), image type (e.g., color or monochrome), resolution (e.g., 1280×960, 640×480, 320×240 and color or monochrome pixels), cropping (e.g., the region of interest around a one-dimensional barcode), time, and previous image processing results (e.g., one-dimensional frame of interest, two-dimensional frame of interest, motion detected, etc).

In some embodiments, the scanner 208 can further sort images according to target frame rates. For example, if the target processing service needs a fixed frame rate of four frames per second, the scanner 208 can use a timer to only select one image every 0.25 seconds.

Some embodiments may also reduce processor 222 load by processing and sorting images in a centralized task to minimize duplication of processor 222 usage for the same task. For example, if the a INC video streaming process needs 640×480 black & white images at a rate of sixteen frames per second, and an ONVIF video-over-Ethernet service needs 640×480 black & white images at a rate of 4 frames per second, the centralized task will process images at the 16 frame per second for the UVC process, and provide every fourth frame to the ONVIF process.

In some further embodiments, the scanner 208 presents the processed and sorted images to each of the desired services for further action. These services may include one or more of, among others, reading one and two dimensional barcodes on printed paper, products, and mobile devices (e.g., smartphones, smartwatches, tablets, etc.), reading DIGIMARC codes, detecting fraud situations (e.g., item substitution fraud), identifying produce for picklist reduction algorithms, providing video-over-USB (UVC) images and streaming video, and providing video-over-Ethernet (ONVIF) images and streaming video.

In some embodiments, the scanner 208 alternates images taken using natural illumination and auto-exposure, with images taken using bright LED illumination from the scan field lighting 220 and fixed-exposure. The auto-exposed images may provide an overall view of a checkout lane and may be used to provide video security images over Ethernet to a network video recording system (NVR). The fixed-exposure images may provide a brightly illuminated, localized view of items as they are scanned, and may be used to read one and two dimensional barcodes.

Figure 3:
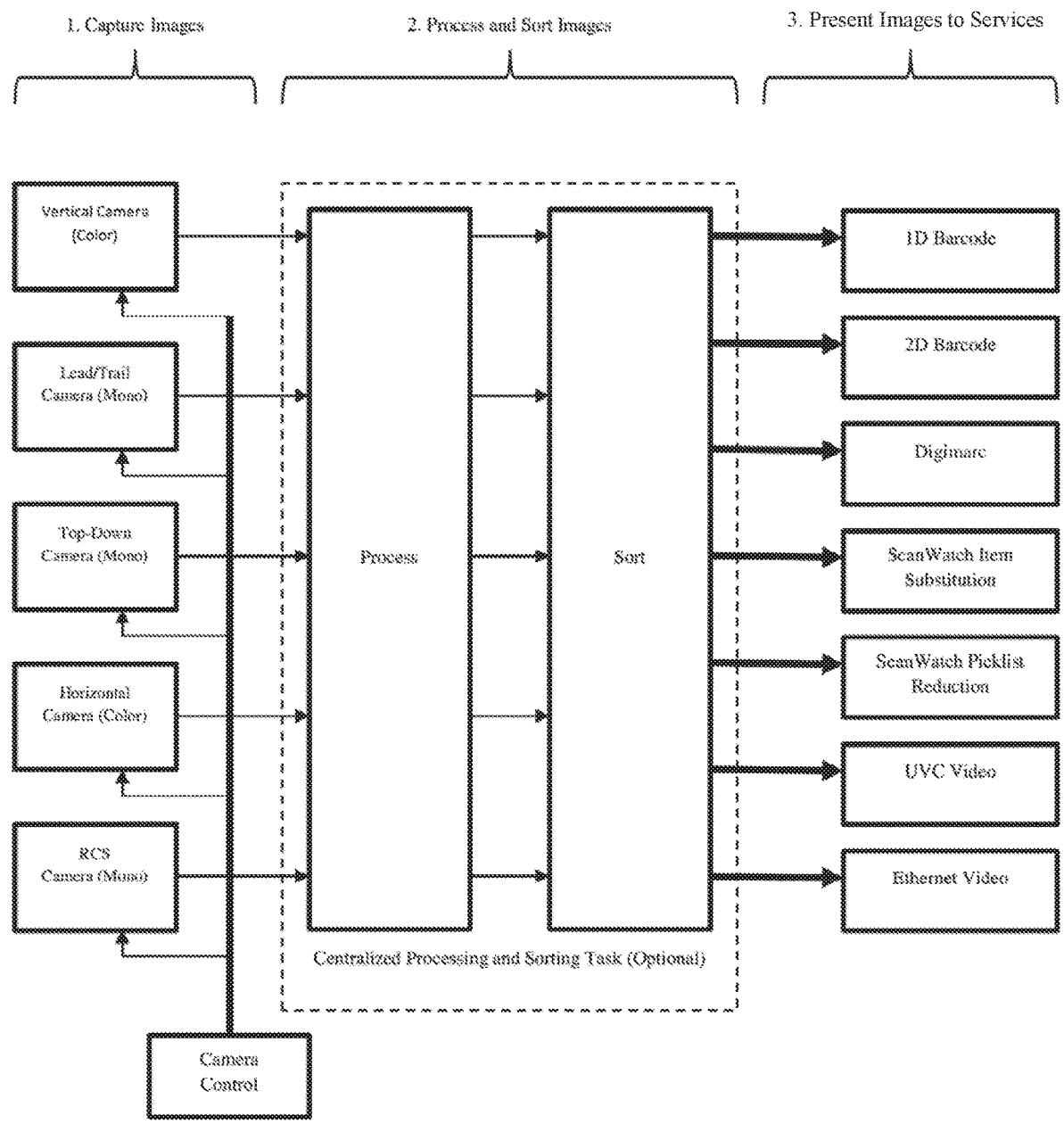
FIG. 3 is a logical block diagram of data flows in a multi-camera simultaneous imaging for multiple processes solution, according to an example embodiment.

FIG. 3 is a logical block diagram of data flows in a multi-camera simultaneous imaging for multiple processes solution, according to an example embodiment. The cameras are listed under the column number 1 where images are captured. The centralized processing and sorting of the images then occurs within the center column number 2. Finally, the services are listed under column 3 to which the processed and sorted images are presented.

Figure 4:
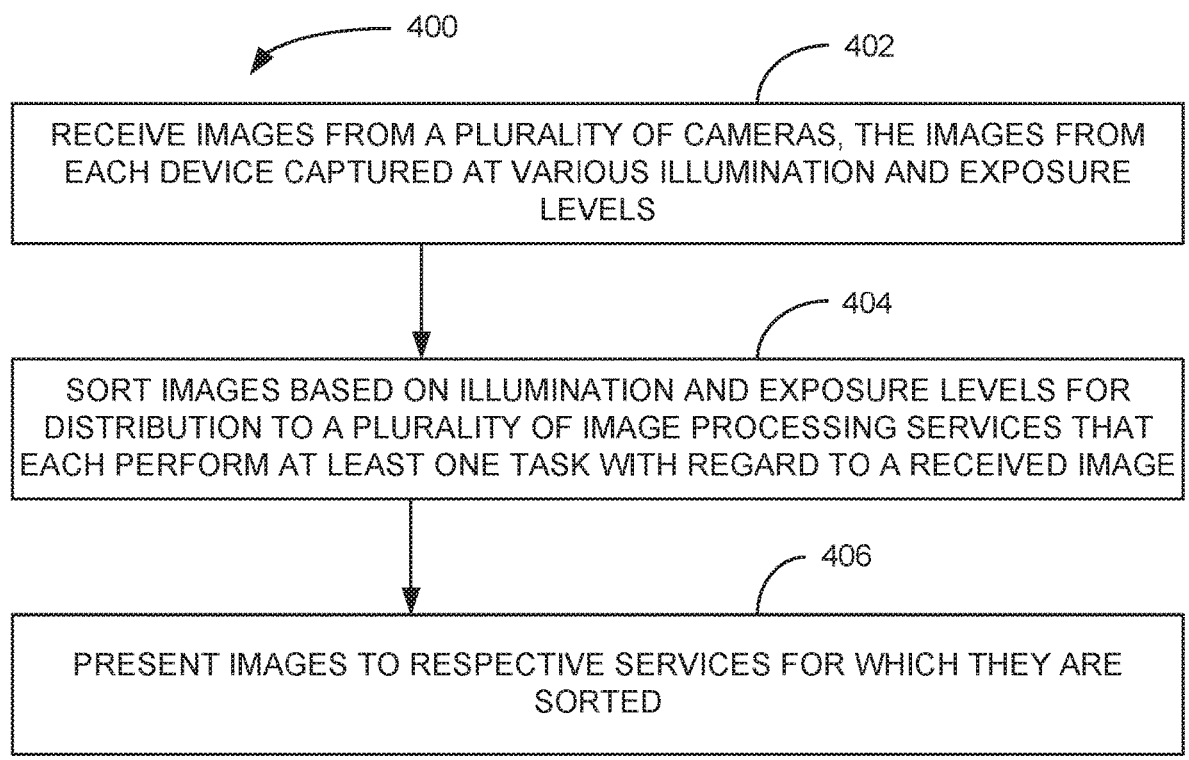
FIG. 4 is logical block diagram of a method, according to an example embodiment.

FIG. 4 is logical block diagram of a method 400, according to an example embodiment. The method 400 is an example embodiment of the centralized processing and sorting that may occur in some embodiments, such as under the column number 2 of FIG. 3.

The method 400 includes receiving 402 images from a plurality of cameras. The images received from each device may be captured at various illumination and exposure levels. The method 400 may then sort 404 the images based on illumination and exposure levels, among other possible factors, for distribution to a plurality of image processing services that each perform at least one task with regard to a received image. The images may then be presented 406 to respective services for which they are sorted 404.

In some embodiments of the method 400, at least one of the cameras from which images are received is a camera of a product scanner on which the method is performed.

In another embodiment, at least one of the tasks for which the images are sorted 404 includes a barcode reading task that is performed with regard to a received 402 image to read a barcode present therein. In one such embodiment, when the barcode to be read within an image is a one-dimensional barcode, the sorting 404 of images includes sorting 404 images captured with an illumination source turned on and by a camera with a certain fixed exposure level for one-dimensional barcode reading. However, when the bar code to be read within an image is a two-dimension barcode, the sorting 404 of images includes sorting 404 images captured with an illumination source turned off and by a camera with an auto-exposure level for two-dimensional barcode reading.

In some embodiments of the method 400, the sorting 404 of images based on illumination and exposure levels includes sorting 404 images captured by cameras with an auto-exposure level for presenting to a video recording service. In other embodiments or other instances in some of the embodiments, the sorting 404 of images based on illumination and exposure levels includes sorting at least one image into a plurality of possible groups for presenting to a plurality of services for further processing.

Figure 5:
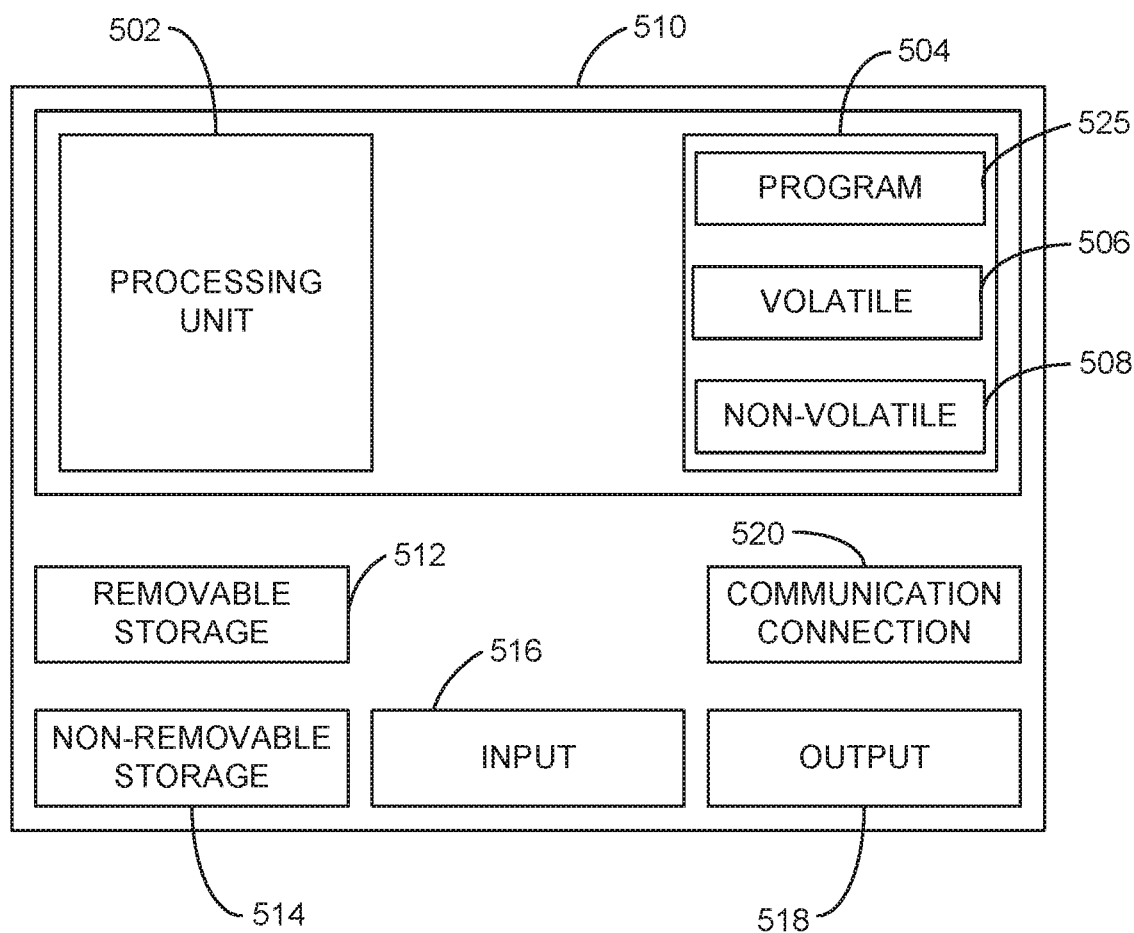
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes a variety of computer-readable media, such as volatile memory 506 and non-volatile memory 508, removable storage 512 and non-removable storage 514.

Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a non-transitory computer-readable medium. For example, a computer program 525 capable of performing one or more of the methods illustrated and described herein may be embodied as instructions held in the memory 504, removable storage 512, or non-removable storage 514 that executable on the processing unit 502 to perform data processing activities to perform the methods.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
providing, at a checkout terminal, a product scanner with processor and a plurality cameras enclosed therein;
receiving digital images from the plurality of cameras of the product scanner, the processor of which performs the method, the digital images from each camera captured at various illumination and exposure levels including digital images captured with natural illumination and auto-exposure providing an overall view of an area;
automatically, by the processor, sorting the digital images based on illumination and exposure levels of the respective digital images for distribution to a plurality of digital image processing services that each perform at least one task with regard to a received digital image, the automatic sorting of the digital images including an automatic sorting of digital images captured by cameras with an auto-exposure level for presenting to a video recording service;
simultaneously, by the processor, reading any barcodes presented in the digital images from the digital images and providing barcode information from the reading to the checkout terminal over a universal serial bus (USB) connection of the product scanner; and
transmitting digital images to respective services for which they are automatically sorted, wherein transmitting further includes transmitting the digital images over a video-over-Ethernet connection of the product scanner to at least one of the service associated with a security video monitoring and recording service.

2. The method of claim 1, wherein at least one of the tasks for which the digital images are automatically sorted includes a barcode reading task that is performed with regard to a digital image to read a barcode present therein.

3. The method of claim 2, wherein when the barcode to be read within a digital image is:
a one-dimensional barcode, the automatic sorting of the digital images includes automatically sorting digital images captured with an illumination source turned on and by a camera of the plurality of cameras with a certain fixed exposure level for one-dimensional barcode reading; and
a two-dimension barcode, the automatic sorting of the digital images includes automatically sorting digital images captured with an illumination source turned off and by a camera of the plurality of cameras with an auto-exposure level for two-dimensional barcode reading.

4. The method of claim 1, wherein the automatic sorting of digital images based on illumination and exposure levels includes automatically sorting at least one digital image into a plurality of possible groups for presenting to a plurality of services for further processing.

5. The method of claim 1, wherein the illumination of the digital images corresponds to an illumination source being turned on or off.

6. The method of claim 5, wherein the illumination of the digital images includes a plurality of factors corresponding to a plurality of illumination source variables including an illumination color, an illumination brightness, and an illumination duration.

7. The method of claim 1, wherein the automatic sorting of the digital images for distribution to a plurality of digital image processing services includes digital image processing to conform the digital image to requirements of the digital image processing services, the requirements including at least one of digital image size, digital image resolution, color-to-monochrome, and contrast level.

8. A method comprising:

provewid, at a checkout terminal, a product scanner with processor and a plurality cameras enclosed therein;

receiving digital images from the plurality of cameras of the product scanner, the processor of which performs the method, the digital images from each camera captured at various illumination and exposure levels including digital images captured with natural illumination and auto-exposure providing and overall view of an area;

automatically, by the processor, sorting digital images based on illumination and exposure levels of the respective digital images for distribution to a plurality of digital image processing services that each perform at least one task with regard to a received digital image, the automatic sorting of the digital images including an automatic sorting of digital images captured by cameras with an auto-exposure level for presenting to a video recording service;

simultaneously, by the processor, reading any barcodes presented in the digital images from the digital images and providing barcode information from the reading to the checkout terminal over a universal serial bus (USB) connection of the product scanner;

processing digital images to conform to requirements of digital image processing services to which the digital images are to be provided; and transmitting digital images to respective services for which they are automatically sorted, wherein transmitting further includes transmitting the digital images over a video-over-Ethernet connection of the product scanner to at least one of the service associated with a security video monitoring and recording service.

9. The method of claim 8, wherein processing the digital images to conform to requirements of digital image processing services to which the digital images are to be provided includes processing to conform the digital images to requirements of the digital image processing services, the requirements including at least one of digital image size, digital image resolution, color-to-monochrome, and contrast level.

10. The method of claim 9, wherein processing the digital images to conform to requirements of digital image processing services to which the digital images are to be provided further includes an optimization process that identifies similar digital image processing requirements for the various digital image processing services when a single digital image is to be provided to multiple digital image processing services to avoid duplicative digital image processing when possible.

11. The method of claim 8, wherein at least one of the cameras from which digital images are received is an overhead camera located above a plane of a horizontal surface of the product scanner.

12. The method of claim 8, wherein presenting digital images to respective services for which they are automatically sorted includes at least one barcode reading service and a fraud detection service.

13. A product scanner device comprising:

a plurality of cameras;

a processor; and a memory storing instructions executable on the processor to perform data processing activities comprising:

receiving digital images from the plurality of cameras including digital images, the digital images from each camera captured at various illumination and exposure levels including digital images captured with natural illumination and auto-exposure providing an overall view of an area;

automatically sorting digital images based on illumination and exposure levels of the respective digital images for distribution to a plurality of digital image processing services that each perform at least one task with regard to a received digital image, the automatic sorting of the digital images including an automatic sorting of digital images captured by cameras with an auto-exposure level for presenting to a video recording service;

simultaneously reading any barcodes presented in the digital images from the digital images and providing barcode information from the reading to a checkout terminal over a universal serial bus (USB) connection of the product scanner; and presenting digital images to respective services for which they are automatically sorted, wherein presenting further includes transmitting the digital images over a video-over-Ethernet connection of the product scanner device to at least one of the service associated with a security video monitoring and recording service.

14. The device of claim 13, wherein at least one of the tasks for which the digital images are automatically sorted includes a barcode reading task that is performed with regard to a digital image to read a barcode present therein, the barcode reading task performed on the device.

15. The device of claim 14, wherein when the barcode to be read within a digital image is:

a one-dimensional barcode, the automatic sorting of digital images includes automatically sorting digital images captured with an illumination source turned on and by a camera of the plurality of cameras with a certain fixed exposure level for one-dimensional barcode reading; and a two-dimension barcode, the automatic sorting of digital images includes automatically sorting digital images captured with an illumination source turned off and by a camera of the plurality of cameras with an auto-exposure level for two-dimensional barcode reading.

16. The device of claim 13, wherein the automatic sorting of digital images based on illumination and exposure levels includes automatically sorting at least one digital image into a plurality of possible groups for presenting to a plurality of services for further processing.

* * * * *